(12) United States Patent
Snoke et al.

(10) Patent No.: US 11,766,079 B2
(45) Date of Patent: Sep. 26, 2023

(54) FACE MASK AND METHOD OF MAKING THE SAME

(71) Applicant: Under Armour, Inc., Baltimore, MD (US)

(72) Inventors: Margaret Snoke, Baltimore, MD (US); Joshua Hiney, Baltimore, MD (US); Breanne Hitch, Baltimore, MD (US); Randall Harward, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 55 days.

(21) Appl. No.: 17/217,918

(22) Filed: Mar. 30, 2021

(65) Prior Publication Data

US 2021/0298375 A1 Sep. 30, 2021

Related U.S. Application Data

(60) Provisional application No. 63/002,163, filed on Mar. 30, 2020.

(51) Int. Cl.
*A41D 13/11* (2006.01)
*B23K 26/402* (2014.01)
(Continued)

(52) U.S. Cl.
CPC ........ *A41D 13/113* (2013.01); *A41D 13/1161* (2013.01); *B23K 26/402* (2013.01); *D06H 5/00* (2013.01); *D06H 7/00* (2013.01); *A41D 2300/50* (2013.01); *D10B 2501/042* (2013.01); *D10B 2509/00* (2013.01)

(58) Field of Classification Search
CPC .. A41D 13/11; A41D 13/1107; A41D 13/113; A41D 13/1161
See application file for complete search history.

(56) References Cited

U.S. PATENT DOCUMENTS

| 4,419,994 A | * | 12/1983 | Hilton | A41D 13/1123 |
| | | | | 128/206.16 |
| 6,336,459 B1 | | 1/2002 | Miyake et al. | |

(Continued)

FOREIGN PATENT DOCUMENTS

| WO | 2018124504 A1 | 7/2018 |
| WO | 2019022020 A1 | 1/2019 |

(Continued)

*Primary Examiner* — F Griffin Hall
(74) *Attorney, Agent, or Firm* — Maginot, Moore & Beck, LLP

(57) ABSTRACT

A face mask includes a piece of fabric including a main body portion, a first leg extending from first side of the main body portion, and a second leg extending from a second side of the main body portion. A first plurality of slots are arranged along a first side perimeter of the main body portion, and a second plurality of slots are arranged along a second side perimeter of the main body portion. At least one first fold in the piece of fabric extends between the first plurality of slots and at least one second fold extends between the second plurality of slots. The first plurality of slots are aligned and the first leg extends through the first plurality of slots. The second plurality of slots are also aligned and the second leg extends through the second plurality of slots.

19 Claims, 17 Drawing Sheets

(51) Int. Cl.
*D06H 5/00* (2006.01)
*D06H 7/00* (2006.01)

(56) References Cited

U.S. PATENT DOCUMENTS

| | | | |
|---|---|---|---|
| 6,644,314 | B1 | 11/2003 | Elsberg |
| D567,365 | S | 4/2008 | Brunell |
| D567,937 | S | 4/2008 | Gerson et al. |
| 7,677,248 | B2 | 3/2010 | Gerson et al. |
| D620,104 | S | 7/2010 | Curran et al. |
| D638,171 | S | 5/2011 | Goranov et al. |
| D646,380 | S | 10/2011 | Gebrewold et al. |
| 8,061,356 | B2 | 11/2011 | Bowen |
| D657,050 | S | 4/2012 | Henderson et al. |
| 8,171,933 | B2 | 5/2012 | Xue et al. |
| 8,251,065 | B2 | 8/2012 | Kim |
| 8,528,560 | B2 | 9/2013 | Duffy |
| 8,640,704 | B2 | 2/2014 | Spoo et al. |
| 8,695,603 | B2 | 4/2014 | Harold et al. |
| D704,824 | S | 5/2014 | Duffy et al. |
| D708,734 | S | 7/2014 | Curran et al. |
| 8,881,729 | B2 | 11/2014 | Duffy |
| 8,905,034 | B2 | 12/2014 | Goranov et al. |
| 9,386,813 | B2 | 7/2016 | Nagao et al. |
| 9,408,424 | B2 | 8/2016 | Noh et al. |
| D776,257 | S | 1/2017 | Remer et al. |
| 9,603,395 | B2 | 3/2017 | Duffy |
| 9,603,396 | B2 | 3/2017 | Duffy |
| 9,615,612 | B2 | 4/2017 | Duffy |
| 9,616,258 | B2 | 4/2017 | Tsuei |
| 9,655,392 | B2 * | 5/2017 | Mekler .............. A41D 13/1161 |
| 9,770,057 | B2 | 9/2017 | Duffy |
| 9,770,058 | B2 | 9/2017 | Angadjivand et al. |
| 9,770,611 | B2 | 9/2017 | Facer et al. |
| 9,826,786 | B2 | 11/2017 | Duffy |
| 9,868,002 | B2 | 1/2018 | Duffy |
| 9,963,611 | B2 | 5/2018 | Stewart et al. |
| D822,195 | S | 7/2018 | Kwong et al. |
| 10,136,687 | B2 | 11/2018 | Duffy |
| 10,143,246 | B2 | 12/2018 | Houde et al. |
| D837,970 | S | 1/2019 | Henderson et al. |
| 10,182,603 | B2 | 1/2019 | Duffy |
| 10,201,198 | B2 | 2/2019 | Tong et al. |
| 10,227,202 | B2 | 3/2019 | Pamperin |
| 10,238,158 | B2 | 3/2019 | Duffy |
| 10,492,547 | B2 | 12/2019 | Weber et al. |
| 10,494,221 | B2 | 12/2019 | Harris et al. |
| 10,575,571 | B2 | 3/2020 | Angadjivand et al. |
| 10,576,314 | B2 | 3/2020 | Duffy |
| 10,602,785 | B2 | 3/2020 | Duffy |
| 2006/0144404 | A1 * | 7/2006 | Callan ..................... G09F 21/02 |
| | | | 128/206.28 |
| 2009/0151733 | A1 * | 6/2009 | Welchel .............. A41D 13/113 |
| | | | 128/863 |
| 2010/0154805 | A1 | 6/2010 | Duffy et al. |
| 2012/0000473 | A1 * | 1/2012 | Shigematsu ......... A41D 13/113 |
| | | | 128/206.19 |
| 2014/0034059 | A1 * | 2/2014 | Yagi ..................... A62B 23/025 |
| | | | 128/207.11 |
| 2014/0182593 | A1 | 7/2014 | Duffy |
| 2015/0238783 | A1 | 8/2015 | Nguyen et al. |
| 2015/0306432 | A1 | 10/2015 | Orofino |
| 2017/0014653 | A1 | 1/2017 | Duffy |
| 2017/0106217 | A1 * | 4/2017 | Kuhn ................. A41D 13/1192 |
| 2017/0157436 | A1 | 6/2017 | Hosmer |
| 2017/0258150 | A1 | 9/2017 | Abdulqader et al. |
| 2017/0274228 | A1 | 9/2017 | Nguyen et al. |
| 2017/0303608 | A1 | 10/2017 | Chen et al. |
| 2017/0368384 | A1 | 12/2017 | Facer et al. |
| 2018/0021608 | A1 | 1/2018 | Zhou et al. |
| 2018/0027899 | A1 | 2/2018 | Facer et al. |
| 2018/0154195 | A1 | 6/2018 | Henderson et al. |
| 2018/0169447 | A1 | 6/2018 | Eitzman et al. |
| 2018/0295906 | A1 | 10/2018 | Harris et al. |
| 2018/0311905 | A1 | 11/2018 | Harrington et al. |
| 2018/0368493 | A1 | 12/2018 | Houde |
| 2018/0368494 | A1 | 12/2018 | Henderson |
| 2019/0000162 | A1 | 1/2019 | Houde |
| 2019/0174845 | A1 * | 6/2019 | Cheng ................ A41D 13/1115 |
| 2020/0113256 | A1 | 4/2020 | Wagner |
| 2021/0315295 | A1 * | 10/2021 | Jackson ............. A41D 13/1161 |
| 2021/0316165 | A1 * | 10/2021 | Wu ...................... A62B 23/025 |
| 2022/0125132 | A1 * | 4/2022 | Murphy ................ A45D 44/00 |

FOREIGN PATENT DOCUMENTS

| | | |
|---|---|---|
| WO | 2019032041 A1 | 2/2019 |
| WO | 2019135150 A1 | 7/2019 |

* cited by examiner

FOLD SLOT

PINCH ALL THE SLOTS TOGETHER

THEN FEED STRAP THROUGH

FLIP OVER TO THE OTHER SIDE, AND DO THE SAME THING, STARTING WITH MEETING THE FIRST SLOTS

FEED THE SECOND STRAP THROUGH.

PULL IT THROUGH.

TILL YOU GET TO THE NOTCH!

NOW, FIND THE SLOT IN THE FRONT, AND THE NOTCHED TAB ON THE OTHER SIDE.

PULL THE NOTCHED TAB THROUGH THE SLOT.

FACE MASK AND METHOD OF MAKING THE SAME

CROSS-REFERENCE TO RELATED APPLICATIONS

This application claims priority to U.S. provisional patent application Ser. No. 62/002,163, filed Mar. 30, 2020, the contents of which are incorporated herein by reference in their entirety.

FIELD

This application relates to the field of face masks and particularly to disposable medical face masks.

BACKGROUND

Face masks are widely used by both medical professionals and individuals to prevent the spread of disease by limiting the transmission of fluids from and/or into the mouth and nose of the wearer. Medical face masks are provided a number of different forms with different functionalities. Different types of face masks offer different features that appeal to various users and are better suited for specific applications. Examples of such features include ear loop masks, masks with tie straps, masks with elastic straps, and molded masks. Depending on the materials used in the face mask, the face mask may offer low fluid resistance, moderate fluid resistance, or high fluid resistance.

In a health care crisis, such as an epidemic or pandemic, a shortage of face masks may result, depriving both medical professionals and individuals of a critical tool for disease prevention. In these situations, face masks may need to be produced on a large scale as quickly as possible. However, most face mask designs include several different component parts that must be compiled and then assembled, which increases the time required to get these masks to market. These numerous parts and assembly steps also add to the overall cost of the face mask. Accordingly, it would be advantageous to provide face masks that may be quickly and easily assembled in large quantities. It would also be advantageous for such face masks to be inexpensive to produce.

SUMMARY

In at least one embodiment, a face mask includes a piece of fabric including a main body portion, a first leg extending from first side of the main body portion, and a second leg extending from a second side of the main body portion. A first plurality of slots are arranged along a perimeter of the first side of the main body portion, and a second plurality of slots are arranged along a perimeter of the second side of the main body portion. At least one first fold in the piece of fabric extends between the first plurality of slots and at least one second fold extends between the second plurality of slots. The first plurality of slots are aligned and the first leg extends through the first plurality of slots. The second plurality of slots are also aligned and the second leg extends through the second plurality of slots.

In at least one embodiment, a method of making a face mask includes first cutting a sheet of fabric into a predetermined shape including a main body portion, a first leg extending from first side of the main body portion, and a second leg extending from a second side of the main body portion. The method further includes forming a first plurality of slots along a perimeter of the first side perimeter of the main body portion, and forming a second plurality of slots arranged along a perimeter of the second side perimeter of the main body portion. The method also includes inserting the first leg through the first plurality of slots, and inserting the second leg through the second plurality of slots. Thereafter, the method includes placing the main body portion over the face of a wearer, and tying the first leg to the second leg.

In at least one embodiment, a cut piece of fabric is provided for a face mask. The cut piece of fabric includes a main body portion, a first leg extending from a first side of the main body portion, and a second leg extending from a second side of the main body portion. The cut piece of fabric further includes a first plurality of slots arranged along a perimeter of the first side perimeter of the main body portion, and a second plurality of slots arranged along a perimeter of the second side perimeter of the main body portion. Additionally, the cut piece of fabric includes first fold indicia extending between the first plurality of slots, second fold indicia extending between the second plurality of slots, and center fold indicia extending across the main body between the first side and the second side of the main body.

DESCRIPTION

Figure 1:
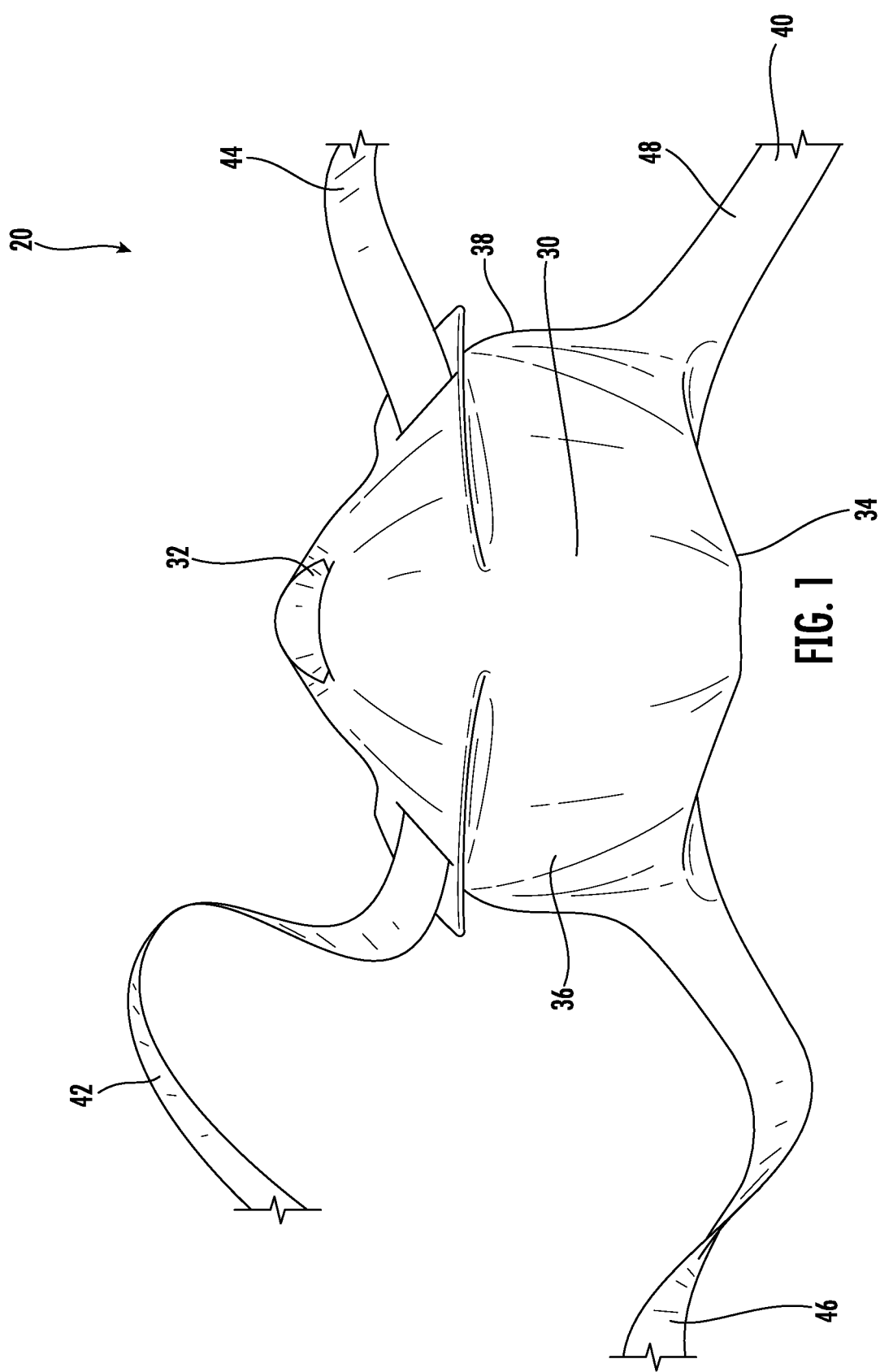
FIG. 1 shows a front perspective view of a one piece face mask.
Figure 2:
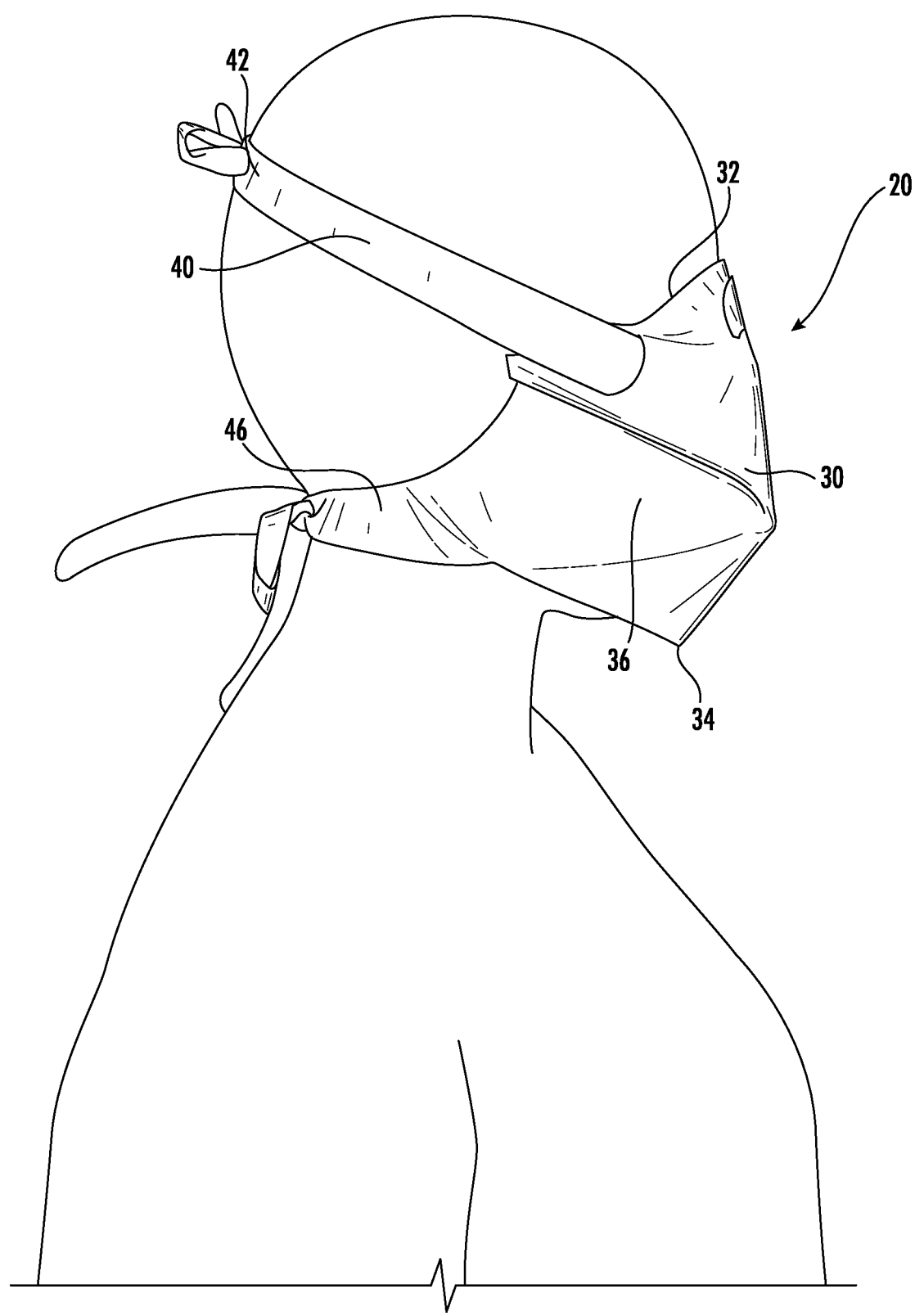
FIG. 2 shows a side view of the face mask of FIG. 1 secured on a human head.

With reference to FIGS. 1 and 2, a face mask 20 includes a face shield 30 with straps 40. The face shield 30 is convex in shape and designed and dimensioned to cover the nose and mouth of the human wearer. The straps 40 extend from the face shield 30 and are configured to secure the face shield 30 to the head of the wearer. The face mask 20 is comprised of one piece of material and may be easily assembled without the use of stitching, adhesives or fasteners.

The face shield 30 includes an upper perimeter 32, a lower perimeter 34, a right perimeter 36 and a left perimeter 38. The upper perimeter 32 has a convex shape and is designed and dimensioned to extend across the face of the wearer below the eyes. In particular, the upper perimeter 32 is configured to extend from a first region near the wearer's right ear, across the bridge of the nose, and to a second region near the wearer's left ear. Similarly, the lower perimeter 34 extends under the face of the wearer from a first region near the right jaw of the wearer, under the chin, and to a second region near the left jaw of the wearer. The right perimeter 36 extends along a right side of the face shield 30 between the upper perimeter 32 and the lower perimeter 34. The left perimeter 38 extends along a left side of the face shield 30 between the upper perimeter 32 and the lower perimeter 34.

The straps 40 extend from the upper perimeter 32 and lower perimeter 34 of the face shield 30. The straps 40 include an upper right strap 42, an upper left strap 44, a lower right strap 46 and a lower left strap 48. The straps 40 all have sufficient length to wrap around to the rear of the wearer's head and tie to another. In particular, as shown in FIG. 2, the upper right strap 42 is configured to tie to the upper left strap 44 in upper back portion of the head of the wearer, and the lower right strap 46 is configured to tie to the lower left strap 48 in the lower back portion of the head/neck of the wearer.

The face mask 20 is unitary in construction as it is made from a single piece of material or comprised of multiple pieces of material that are integrally formed into a single piece. In at least one embodiment, the face mask 20 is formed from a sheet of fabric that is cut into a particular shape in order to provide a single planar piece of material, and that piece of material is then manipulated in order to form the face mask. The single planar piece of material includes several slots that are cut into the fabric and used during formation of the face mask. Specifically, the cut piece of fabric is folded in a predetermined manner with such that various sections of the cut fabric are inserted through the slots in order to assemble the face mask 20. The sheet of material used to form the face mask is typically a medial-grade fabric commonly used to make other types of medical face masks. For example, the sheet of material may be a non-woven 100% polyester, polypropylene, or similar hydrophobic material (a fiber matrix). Such material may be provided as a non-wicking material of 60-100 GSM and 50-200 CFM. Of course, in other embodiments the face mask may be formed with any of various other types of material. In at least some embodiments, the face mask may even be formed from a polyester mix or a cotton material. A laser, die, or other cutting tool may be used to cut the material into the desired shape prior to assembly of the face mask 20.

Figure 3:
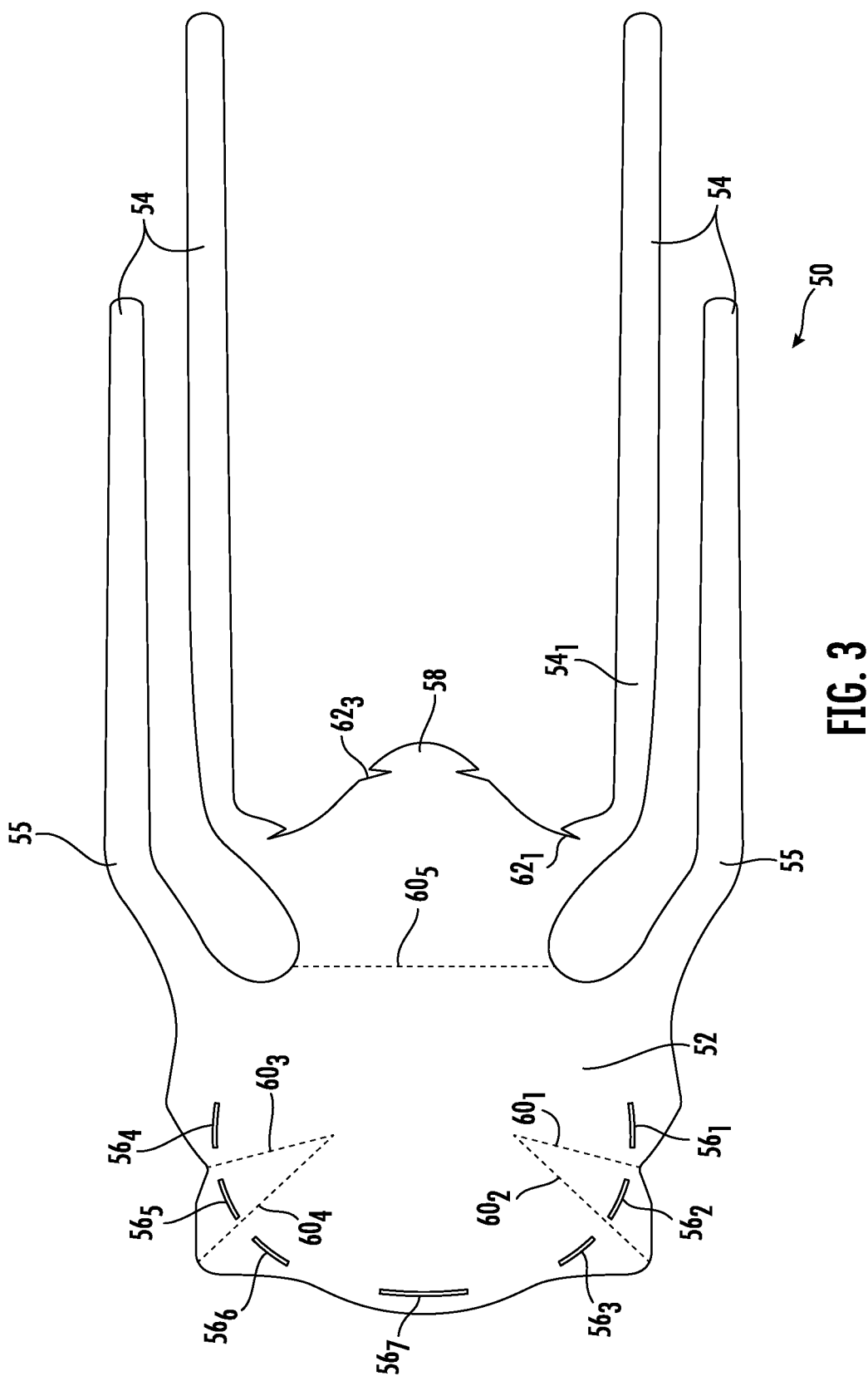
FIG. 3 shows a single piece of material used to form the face mask of FIG. 1 laid-out flat to show the outline of the material.

FIG. 3 shows an exemplary configuration for the single piece of material 50 used to form the face mask 20. Because the single piece of material 50 is cut from a sheet of fabric, it may be laid-out flat, as shown in FIG. 3, prior to assembly. The single piece of material 50 includes a central main body portion 52 with four legs 54 extending therefrom. The main body portion 52 is used to form the face shield 30 and the four legs 54 are used to form the four straps 40. The main body portion 52 includes a contoured upper perimeter that defines a bump-out at a nose bridge portion just above the slot $56_7$. The opposite perimeter of the main body portion 52 is defined along a tab 58. As explained in further detail below, when the mask 20 is formed, the tab 58 is brought into engagement with the slot $56_7$. The lower portion of the mask is then defined along a central fold line $60_5$ that extends through the main body portion 52.

Figure 4:
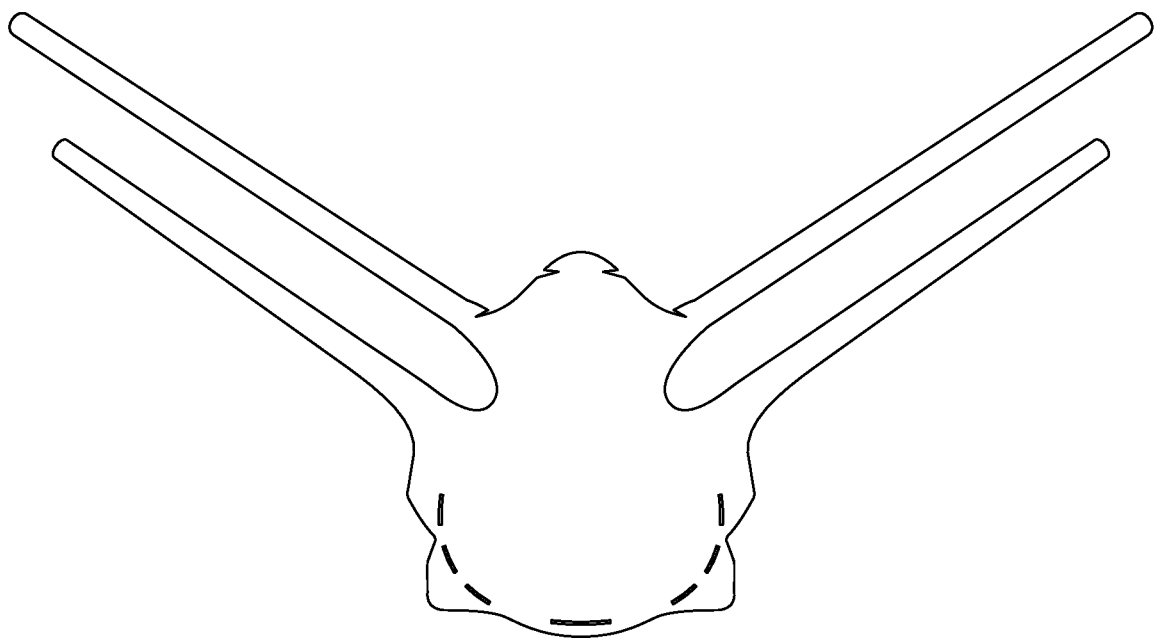
FIGS. 4-20 illustrate a method of assembly of the face mask of FIG. 1.
Figure 5:
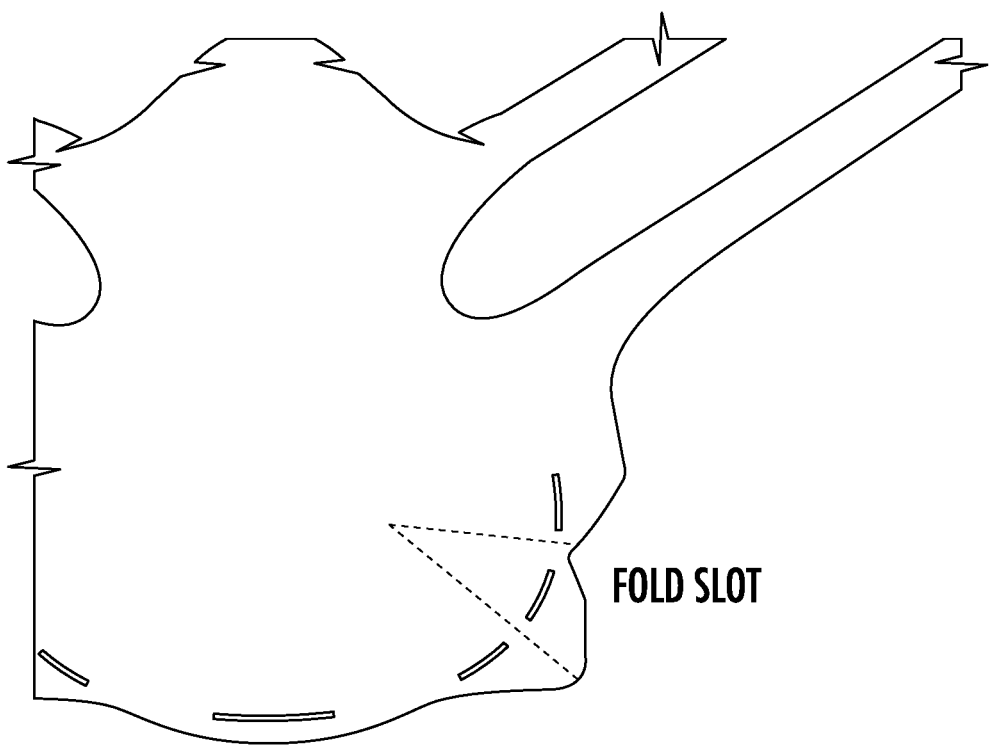
Figure 6:
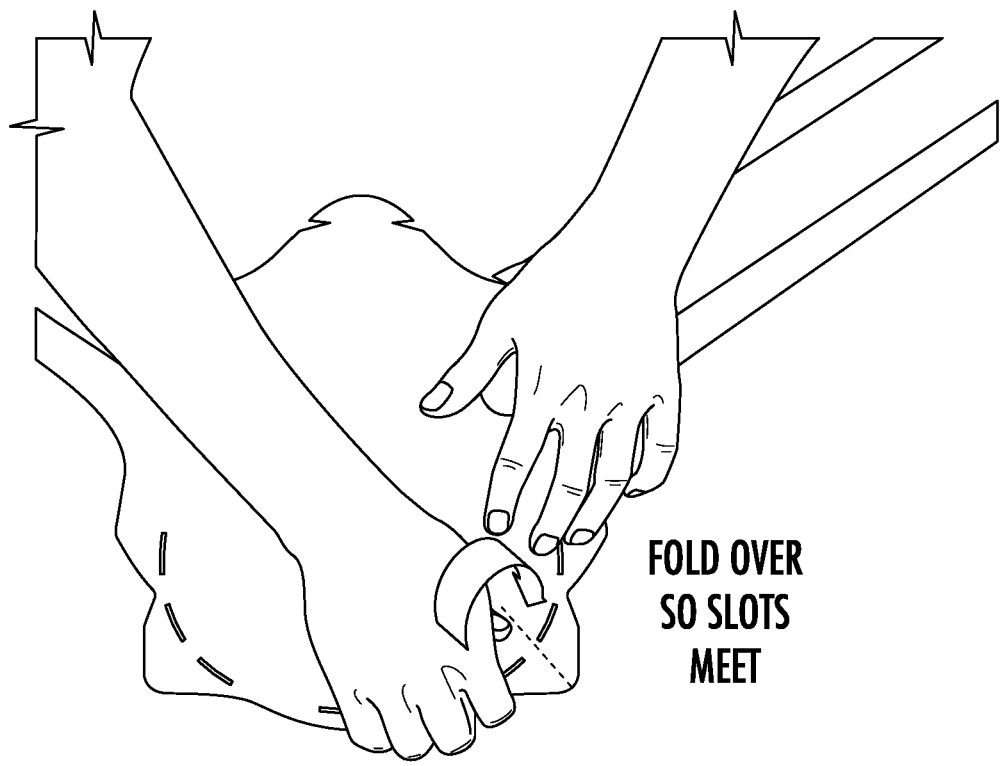
Figure 7:
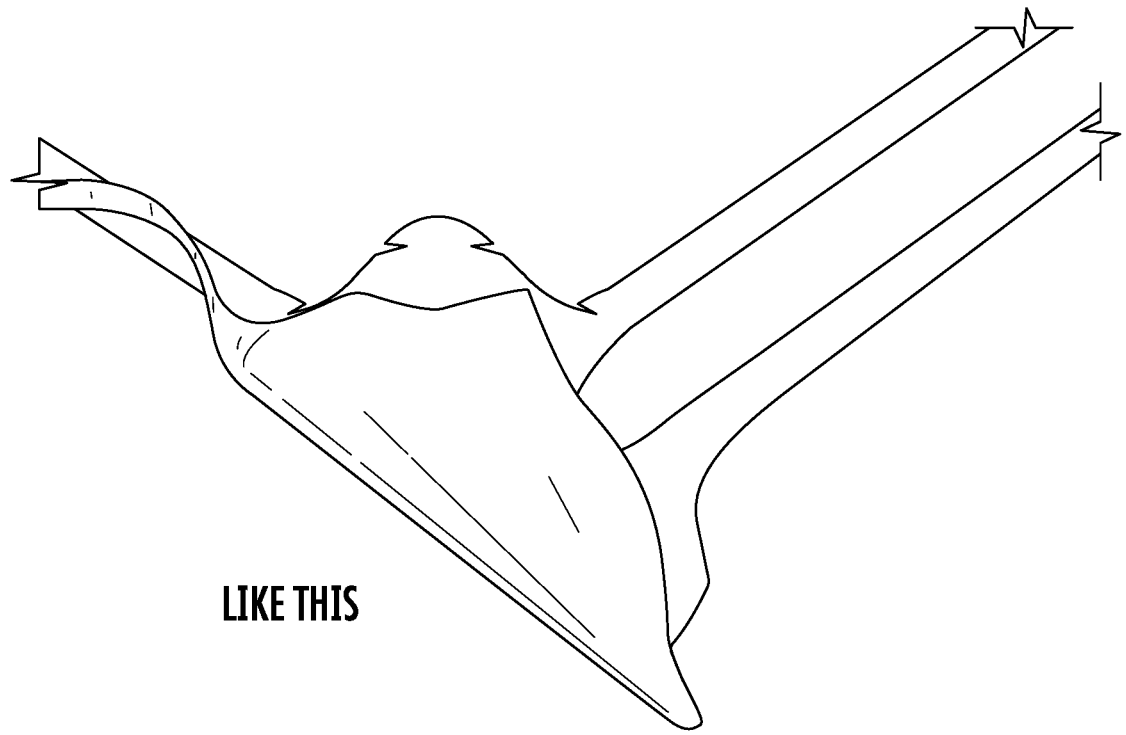
Figure 8:
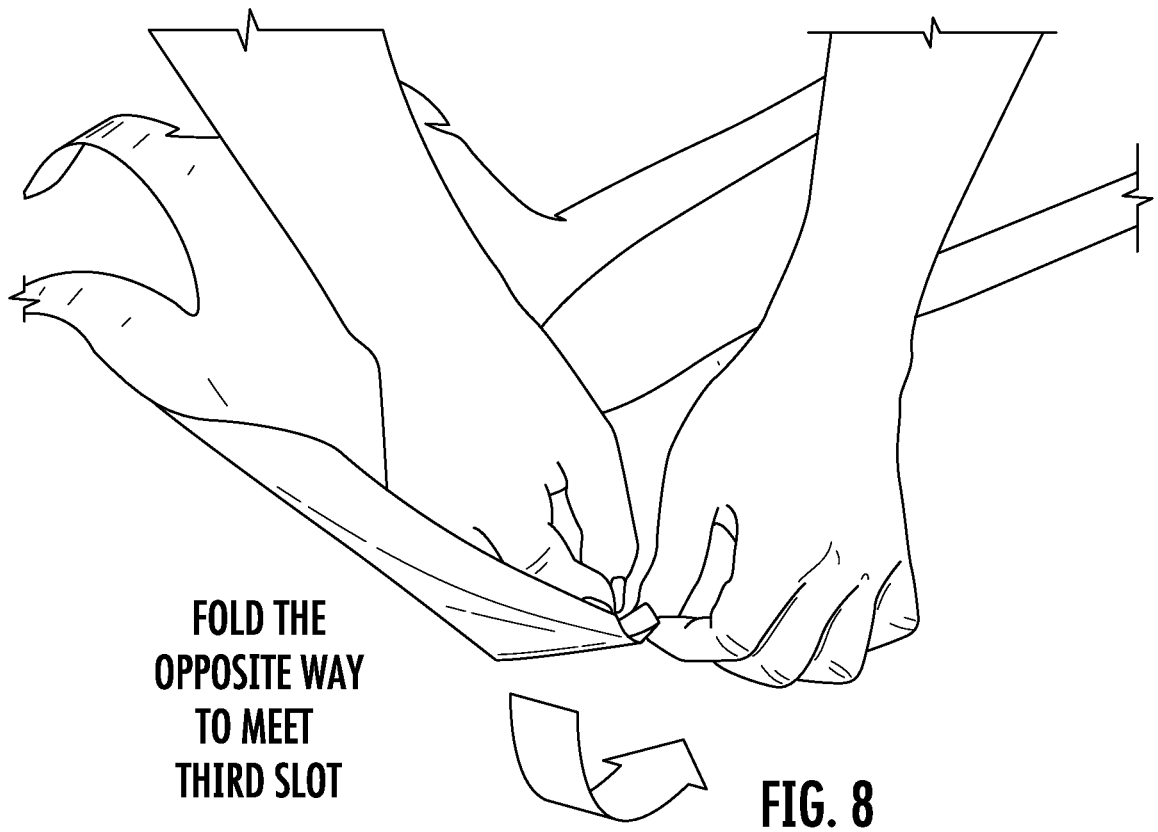
Figure 9:
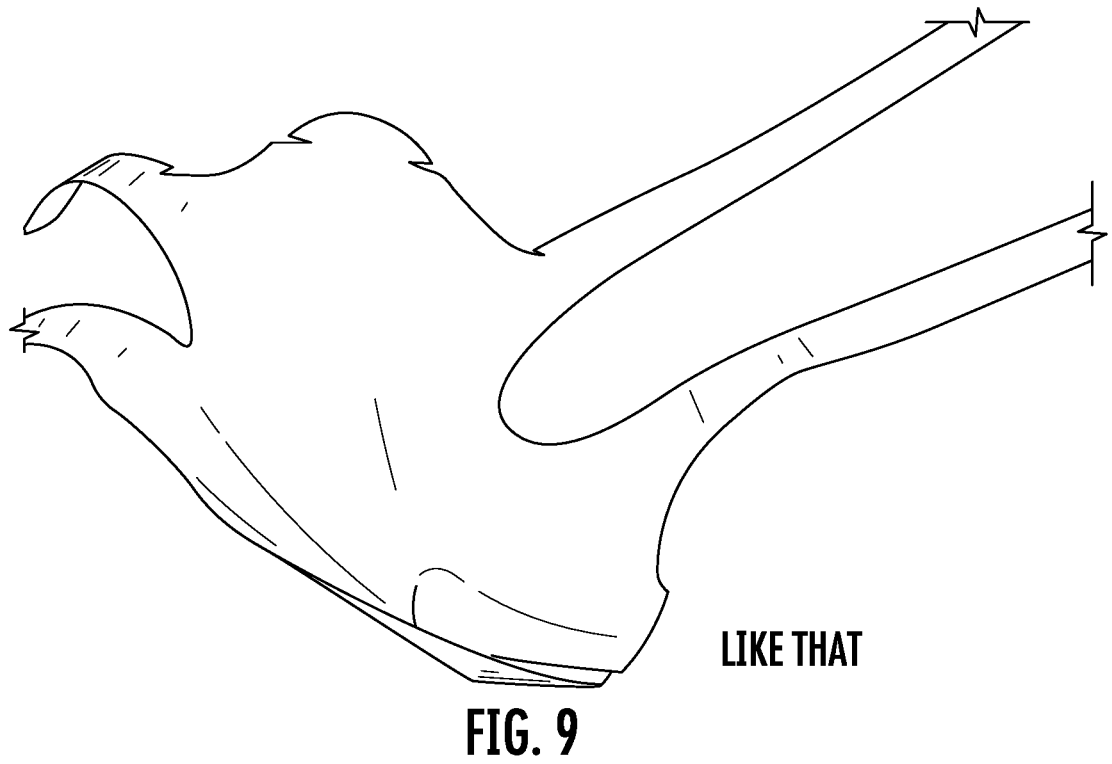
Figure 10:
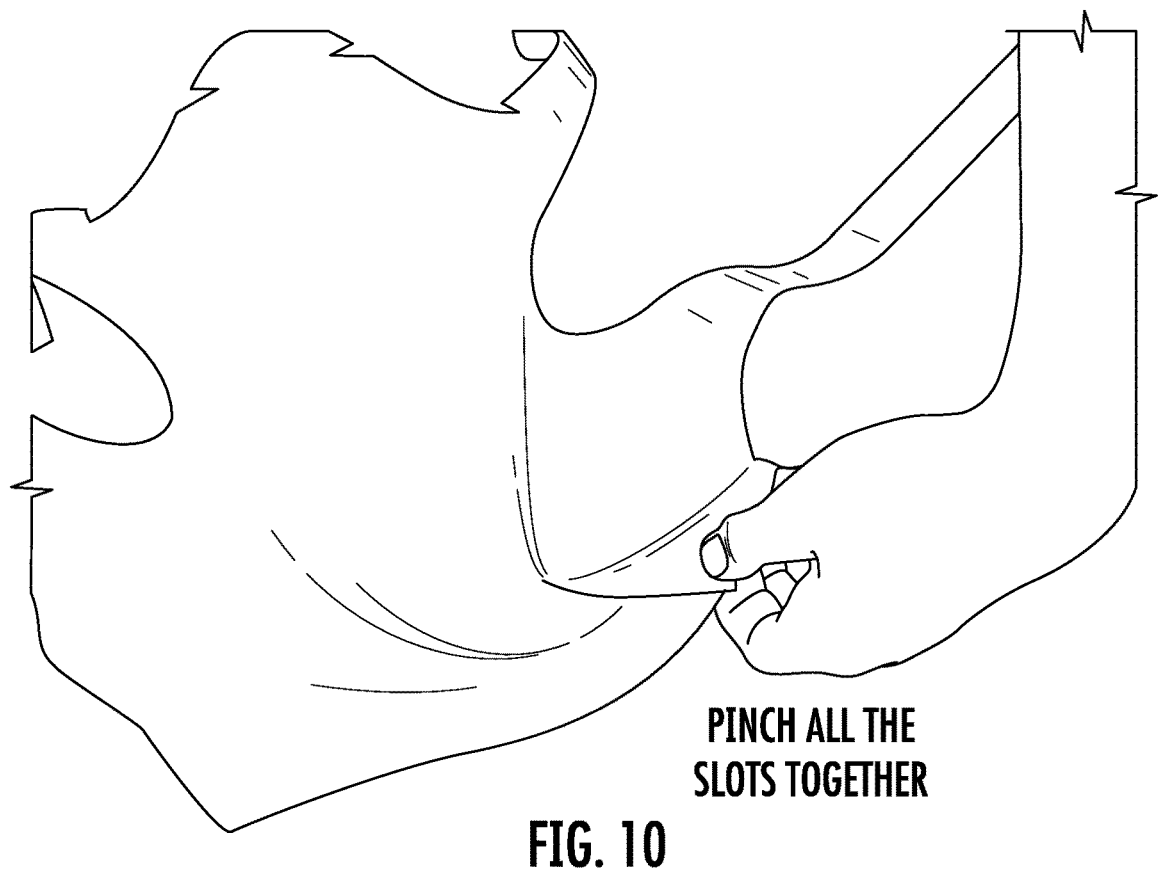

With continued reference to FIG. 3, the legs 54 extend away from the main body portion 52, and may be linear (as shown in FIG. 4) or may include slight bends 55 (as shown in FIG. 3). In the embodiment of FIG. 3, each leg includes a shorter proximate portion that extends away from the main body portion 52 at an angle, and a longer distal portion that extends away from the proximate portion with a bend positioned between the proximate portion and the distal portion. For example, in at least one embodiment as shown in FIG. 3, the proximate portion extends away from the main body portion 52 at an angle of 30° to 60° relative to a central fold line $60_5$, and the distal portion extends away from the proximate portion substantially perpendicular to the central fold line. In this embodiment, the longer distal portions of the legs 54 are all parallel to one another. In other embodiments, such as that shown in FIG. 4, the legs 54 do not include bends and the proximate and distal portions of each leg are in alignment. As a result the two legs on the left side extend away from the main body portion 52 in parallel with one another and at an angle of 30° to 60° relative to the central fold line. Similarly, the two legs on the right side of the mask extend away from the main body portion 52 in parallel with one another and at an angle of 30° to 60° relative to the central fold line. The length of each leg is sufficient to extend around the mask and tie to an opposite leg when the mask is donned by a human. Accordingly, the length of each leg may be between 15 cm and 30 cm.

With reference again to FIG. 3, the main body portion 52 includes seven elongated slots $56_1$-$56_7$ which provide passages through the material 50. The slots $56_1$-$56_6$ are similarly dimensioned and have a width sufficient to pass the legs 54 therethrough (e.g., between one and four centimeters wide). The slot $56_7$ is dimensioned to receive a tab 58 positioned along an edge of the main body portion 52 that is opposite the slot $56_7$. Accordingly, the slot $56_7$ serves as a coupling slot to couple opposing edges of the main body portion 52.

FIG. 3 also shows fold lines $60_1$-$60_5$ where the single piece of fabric is folded during assembly, as described below with reference to FIGS. 4-20. Fold lines $60_1$-$60_2$ are positioned on one side of the mask, intersect at a common apex point, and diverge away from the common apex point an angle of between 20° and 70° toward the perimeter of the sheet of material 50. Slot 562 is positioned between the two fold lines $60_1$ and $60_2$, and slots $56_1$ and $56_3$ are positioned on opposite sides of the fold lines $60_1$ and $60_2$. Complementary fold lines $60_3$-$60_4$ are also provided on the opposite side of the sheet of material, and slots $56_4$-$56_6$ are similarly arranged with respect to the fold lines $60_3$-$60_4$ (with slot $56_5$ between the two fold lines). Center fold line $60_5$ extends across the main body portion 52 and intersects the perimeter of the sheet of material 50 at a location between the two legs on each side of the sheet of material. In at least one embodiment, indicia such as print lines (dotted or solid) or perforations are provided on the sheet of material 50 in order to illustrate the location of the fold lines to the user during the process of assembling the face mask 20.

A number of notches 62 are also formed at various locations along the perimeter of the material 50. As explained in further detail below, the notches 62 are positioned at portions of the fabric that are intended to engage the slots $56_1$-$56_7$, thereby helping to secure such portions in place relative to the slots when the face mask is assembled.

Figure 11:
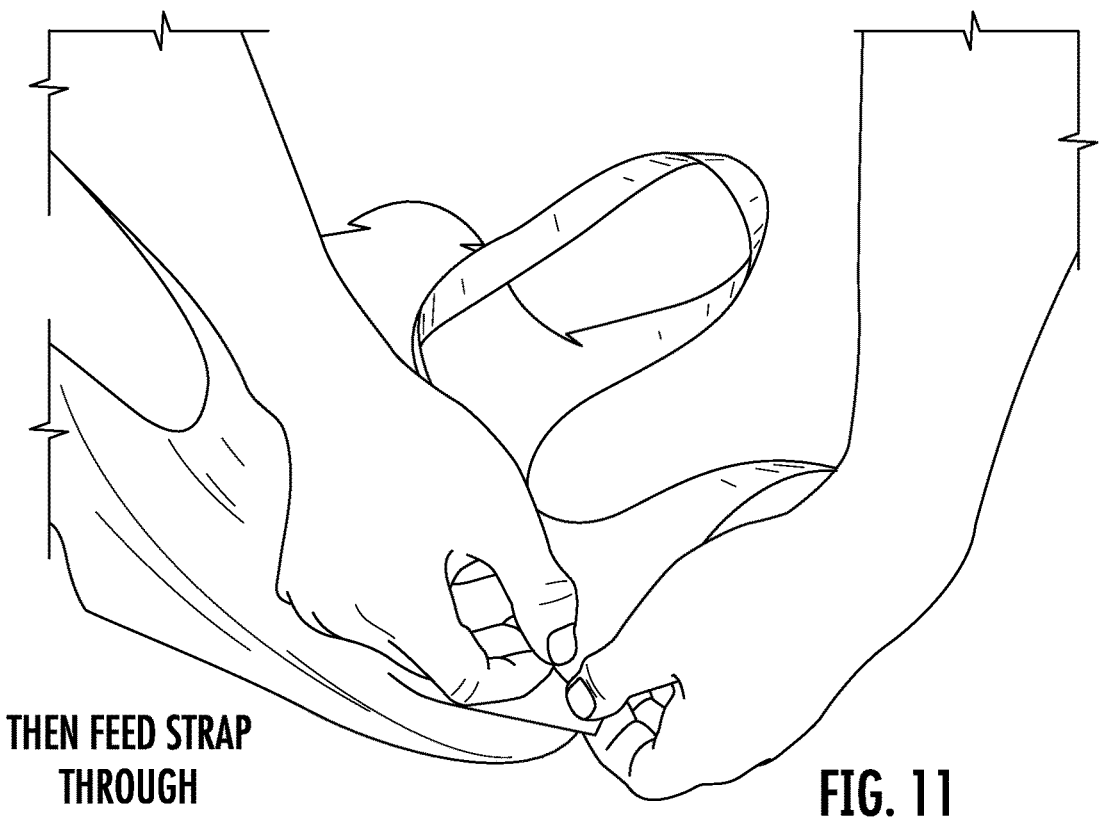
Figure 12:
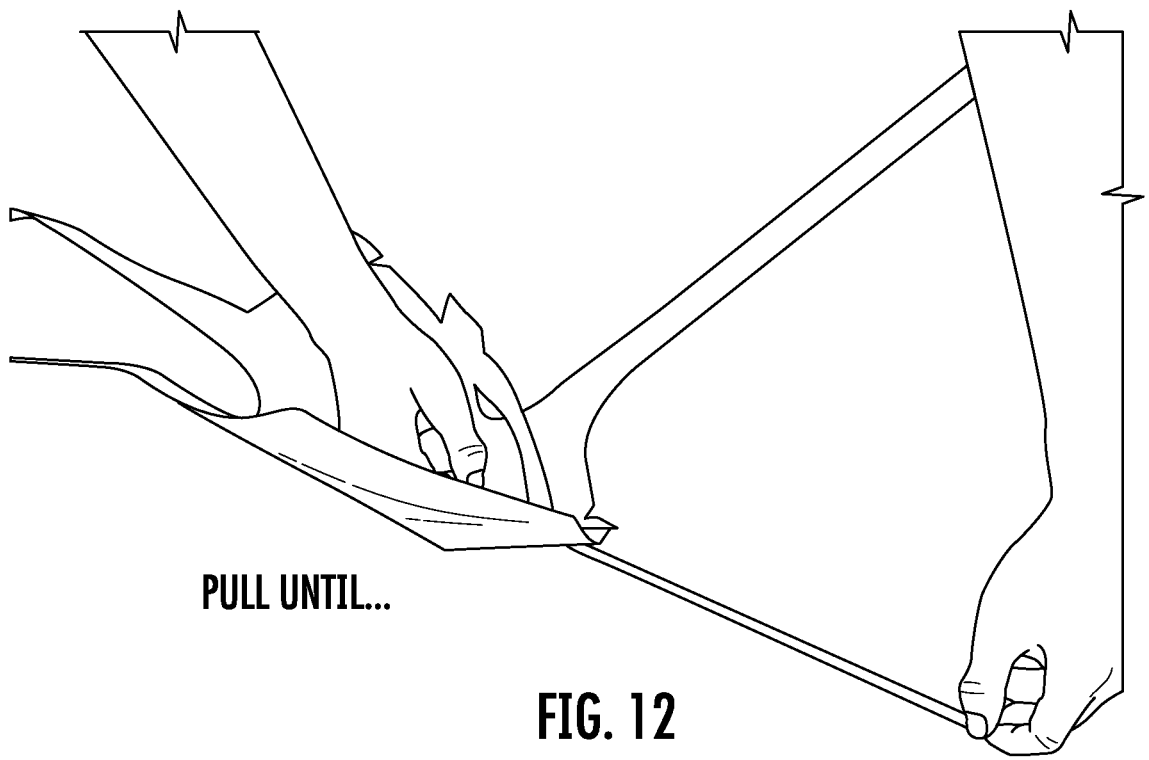
Figure 13:
Figure 14:
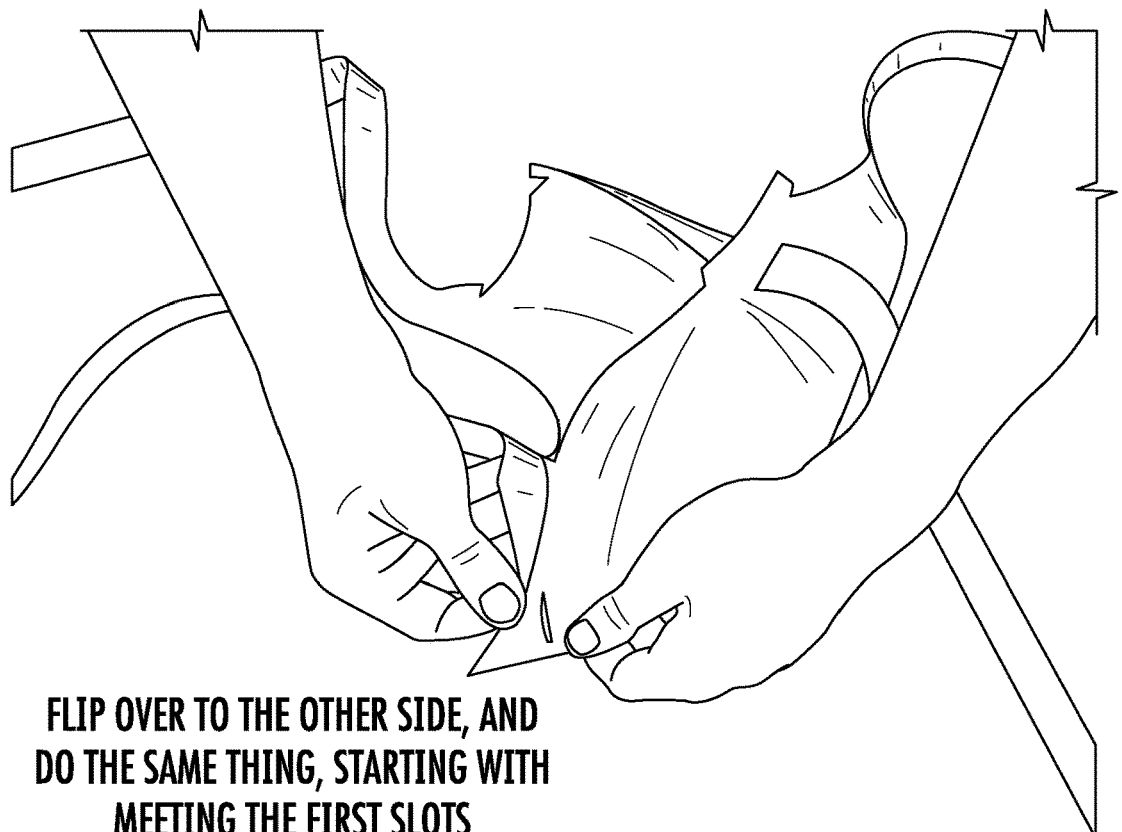
Figure 15:
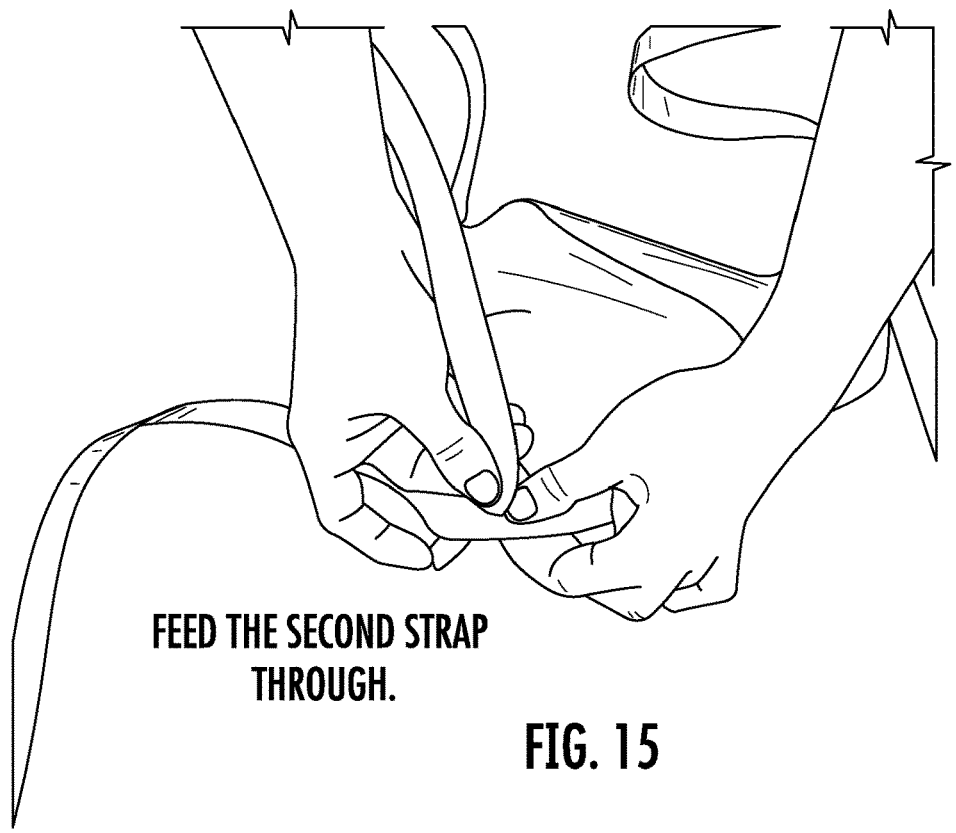
Figure 16:
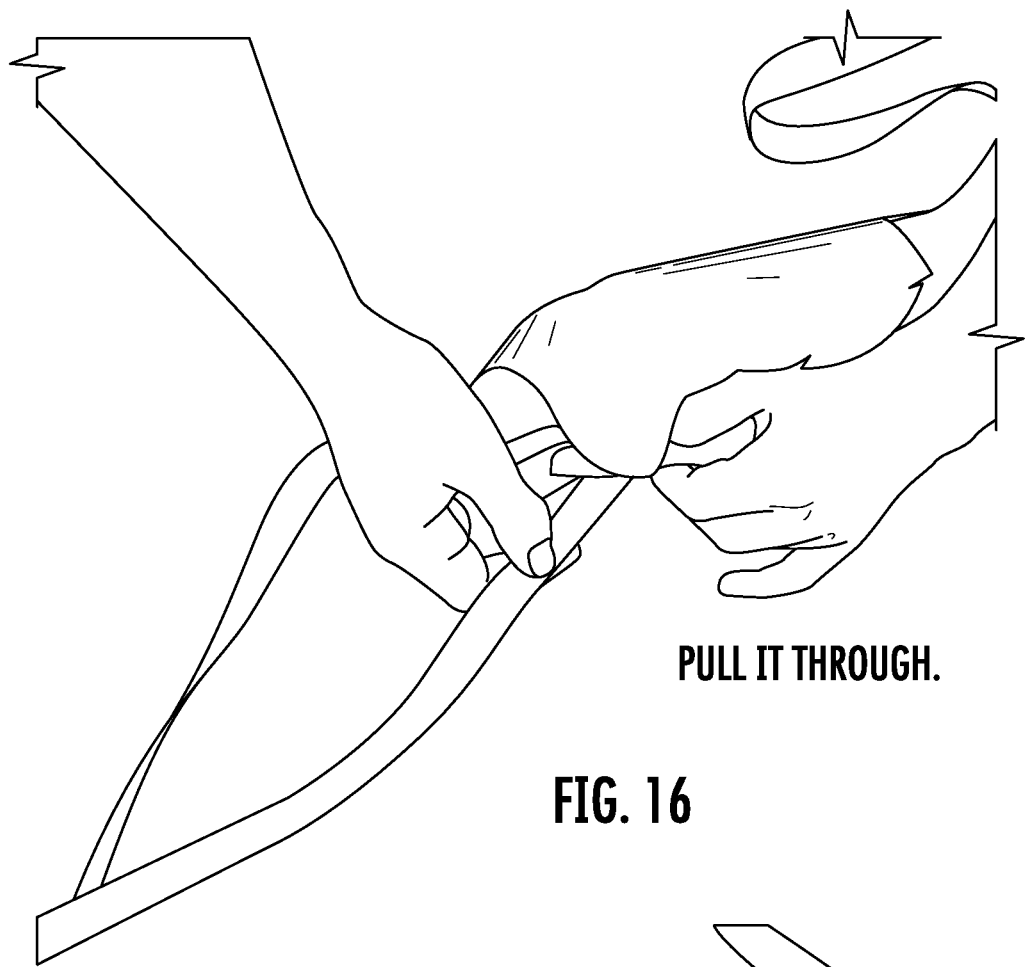
Figure 17:
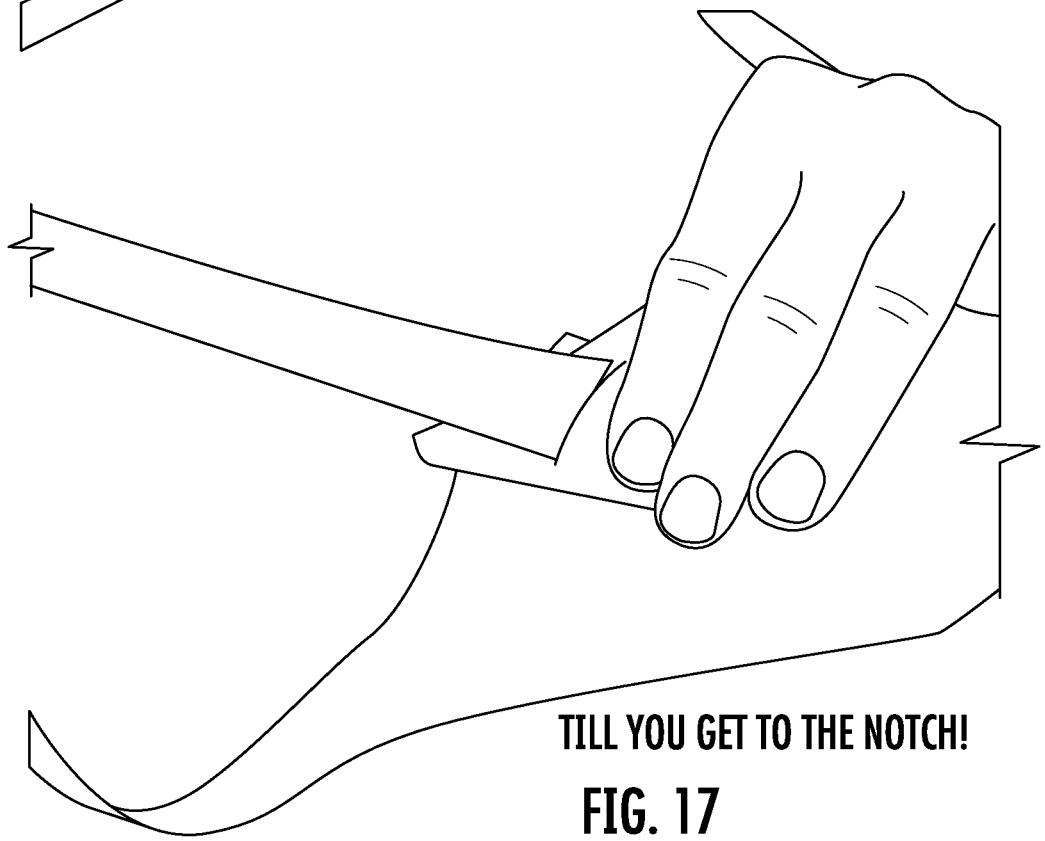
Figure 18:
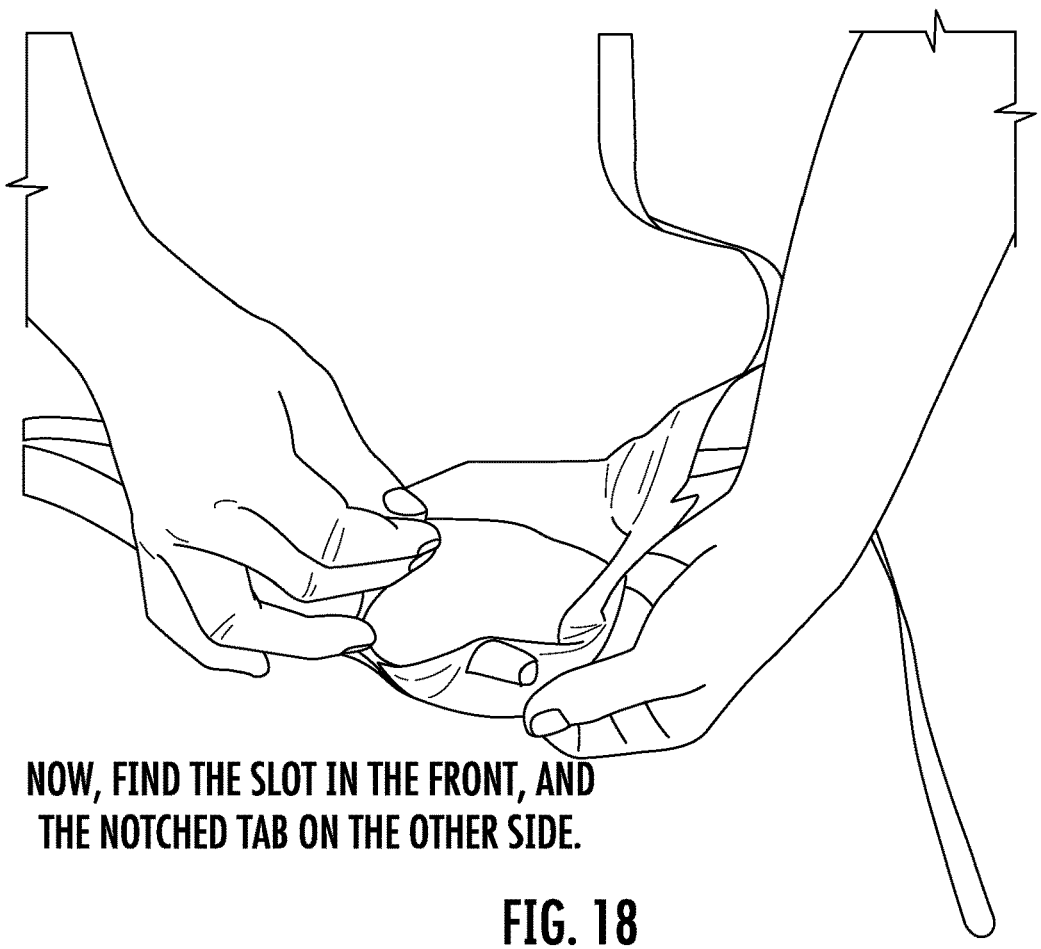
Figure 19:
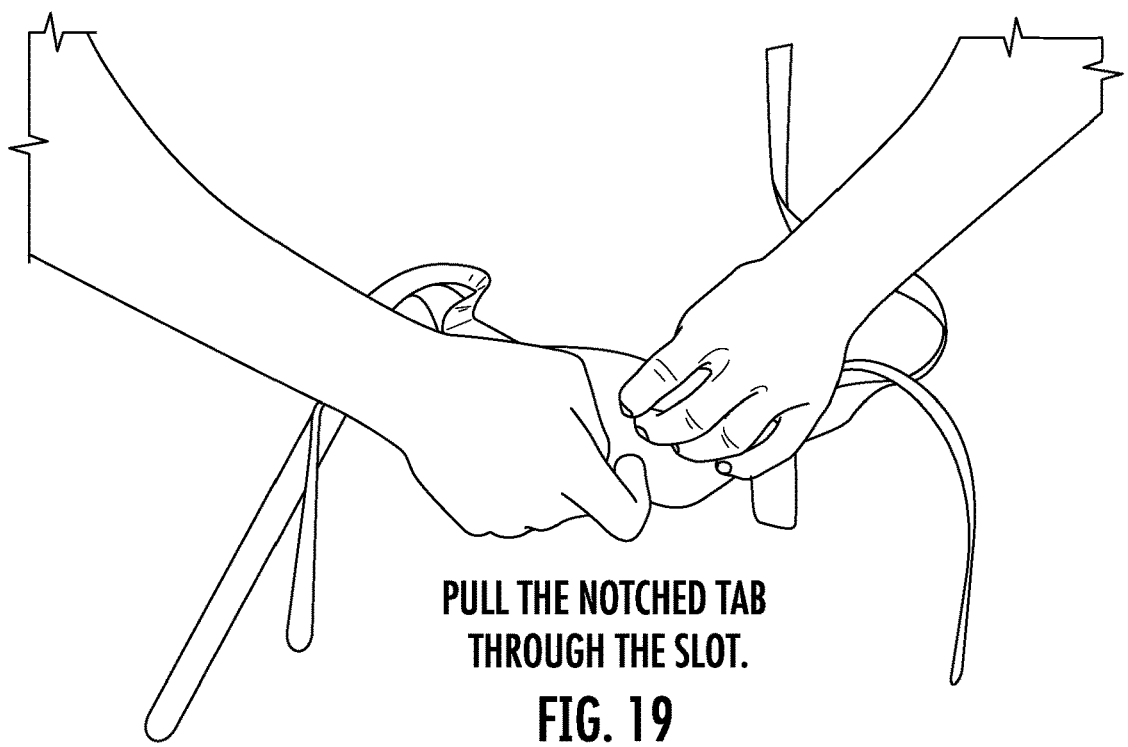
Figure 20:
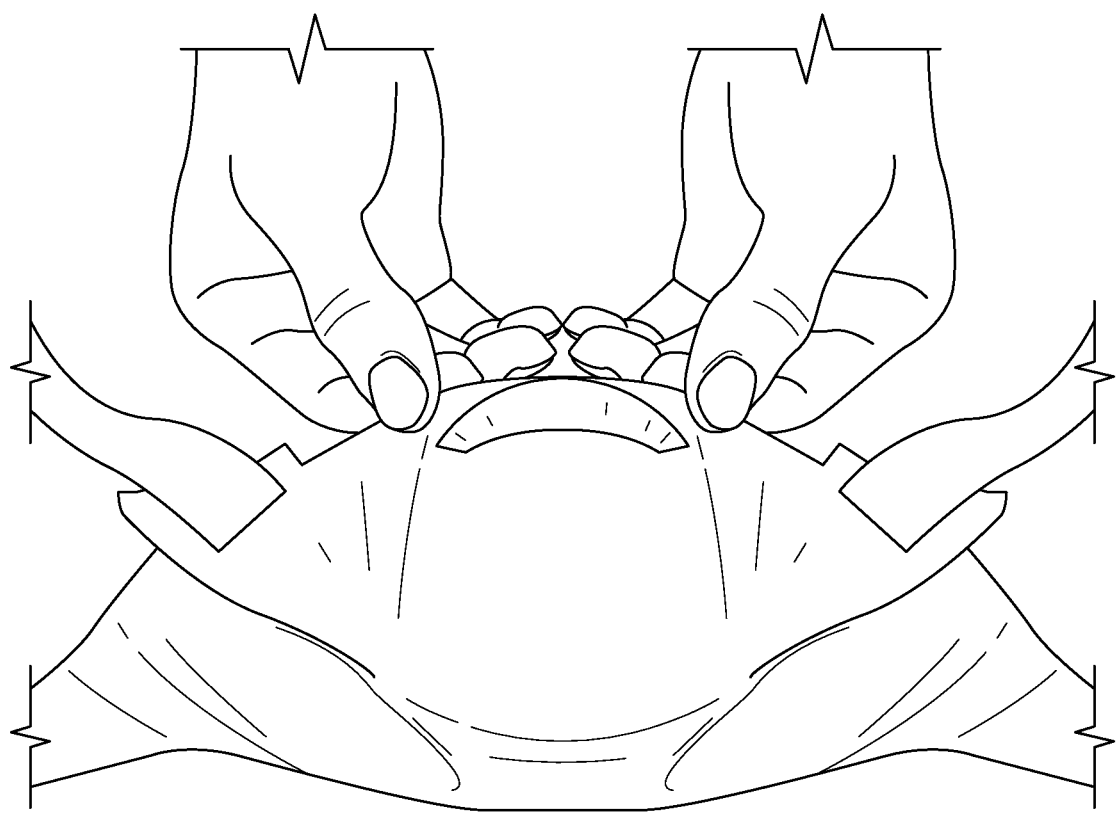
Figure 21:
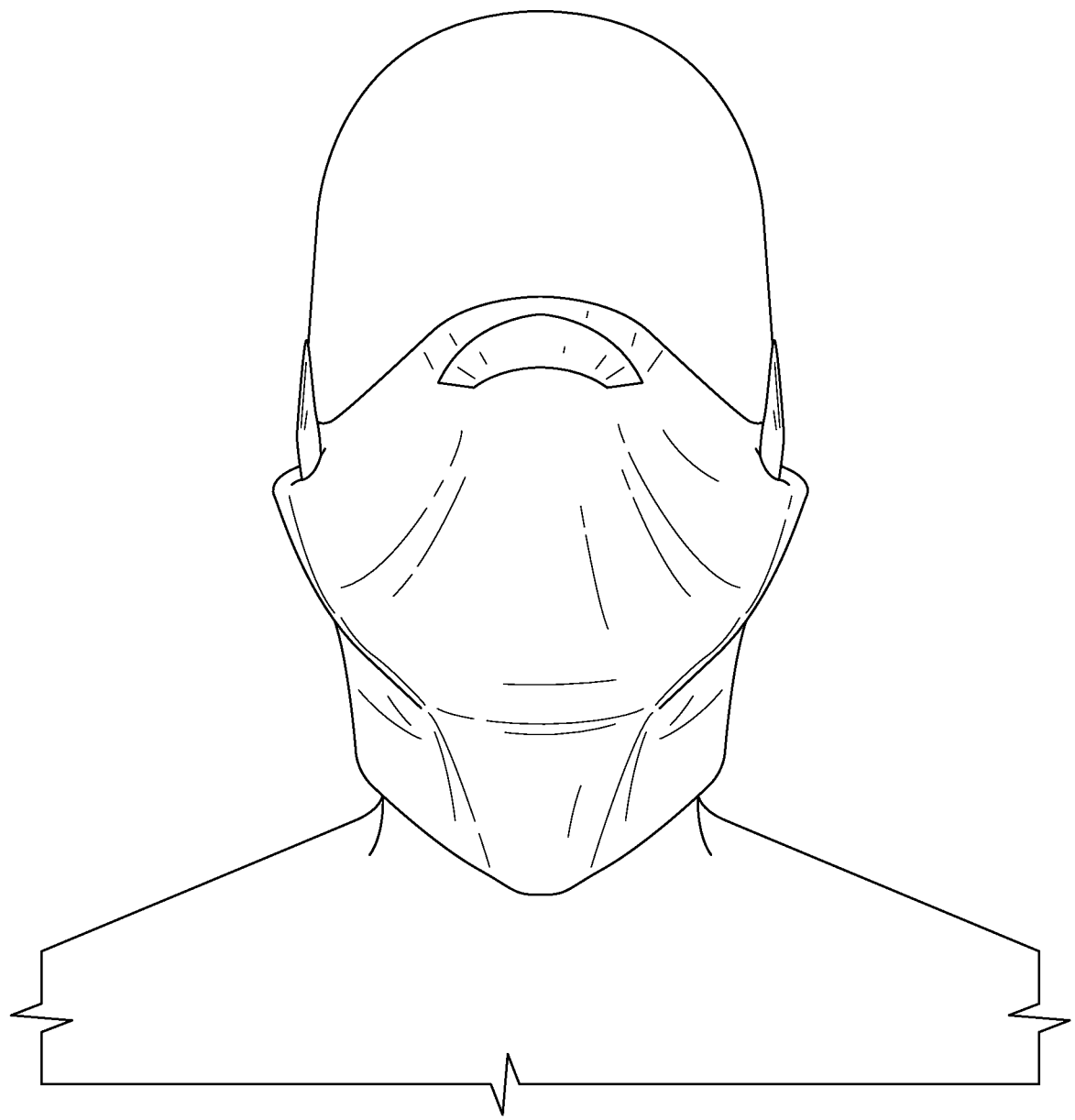
FIG. 21 shows a front view of the face mask assembled in FIGS. 4-20 secured on a human head.
Figure 22:
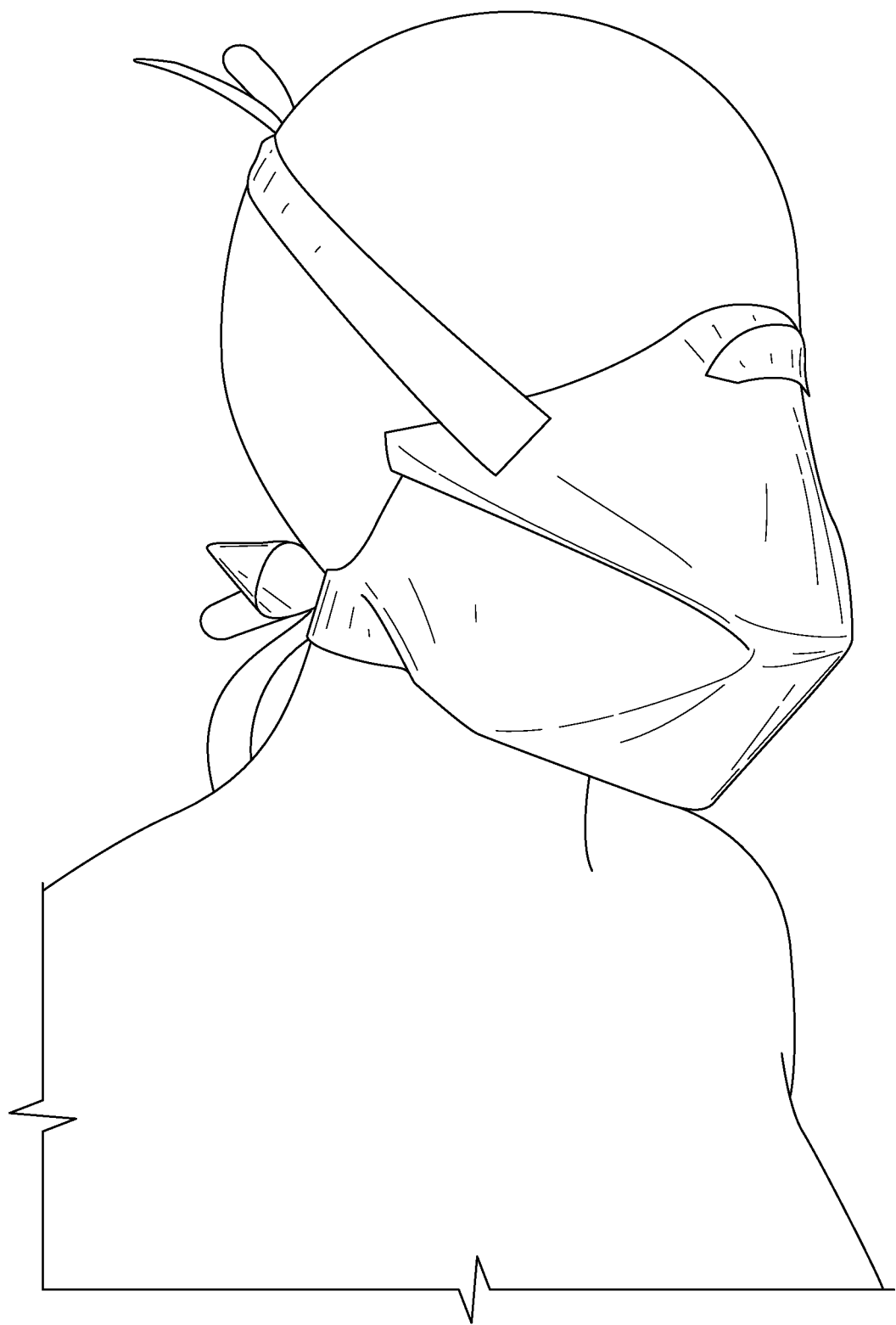
FIG. 22 shows a right-front view of the face mask of FIG. 21.

With reference now to FIGS. 4-20, a method of assembling the face mask 20 is illustrated. As shown in FIG. 4, the method begins when the single piece of material 50 is cut into the desired shape (e.g., the shape of FIG. 3) and laid flat. As shown in FIGS. 5-10, the material is folded at lines $60_1$ and $60_2$ and pinched together such that all three of slots $56_1$-$56_3$ are aligned. To accomplish this a first fold may be made in one direction along fold line $60_1$, thus bringing slot $56_1$ into adjacent alignment with slot $562$ (see FIGS. 5-7), and then a second fold may be made in the opposite direction along fold line $60_2$ to bring slot $56_3$ into adjacent alignment with fold lines $56_1$ and $56_2$ (see FIGS. 8-10). Next, as shown in FIGS. 11-13 the leg 541 (i.e., the more distant leg on the same side of the material as the slots $56_1$-$56_3$) is inserted through the slots $56_1$-$56_3$ and pulled through the slots until the notch 621 at the base of the leg 541 seats in the slots $56_1$-$56_3$. With the notch 621 seated in the slots $56_1$-$56_3$, (i.e., with opposite sides of the notch on opposite sides of the slots), the leg 541 is secured in place and cannot be easily pulled back through the slots $56_1$-$56_3$ without removing the notch from its seated position. This process of aligning the slots and inserting an associated leg is then repeated on the opposite side of the material 50, as shown in FIGS. 14-17. The legs extending through the slots form the upper legs on opposite sides of the face mask. Finally, as shown in FIGS. 18-20, the material 50 is folded along line $60_5$ and the tab 58 is inserted into the slot $56_7$ such that the notches 623 at the sides of the tab 58 seat in the slot $56_7$. This secures the two opposing edges of the main body portion together and forms the top perimeter 32 of the face mask 20 configured to extend across the cheek bones (under the eyes) and nasal bridge of the wearer. The center fold line $60_5$ forms the lower perimeter 34 of the face mask 20 configured to extend along the jaw line under the chin of the wearer. As shown in FIG. 20, assembly of the face mask 20 is now complete. The shape of the face mask 20 is convex with a nose tip formed near the center of the mask, a contoured nose bridge formed along the upper perimeter above the nose tip, and a chin protrusion formed along the lower perimeter below the nose tip.

Figure 23:
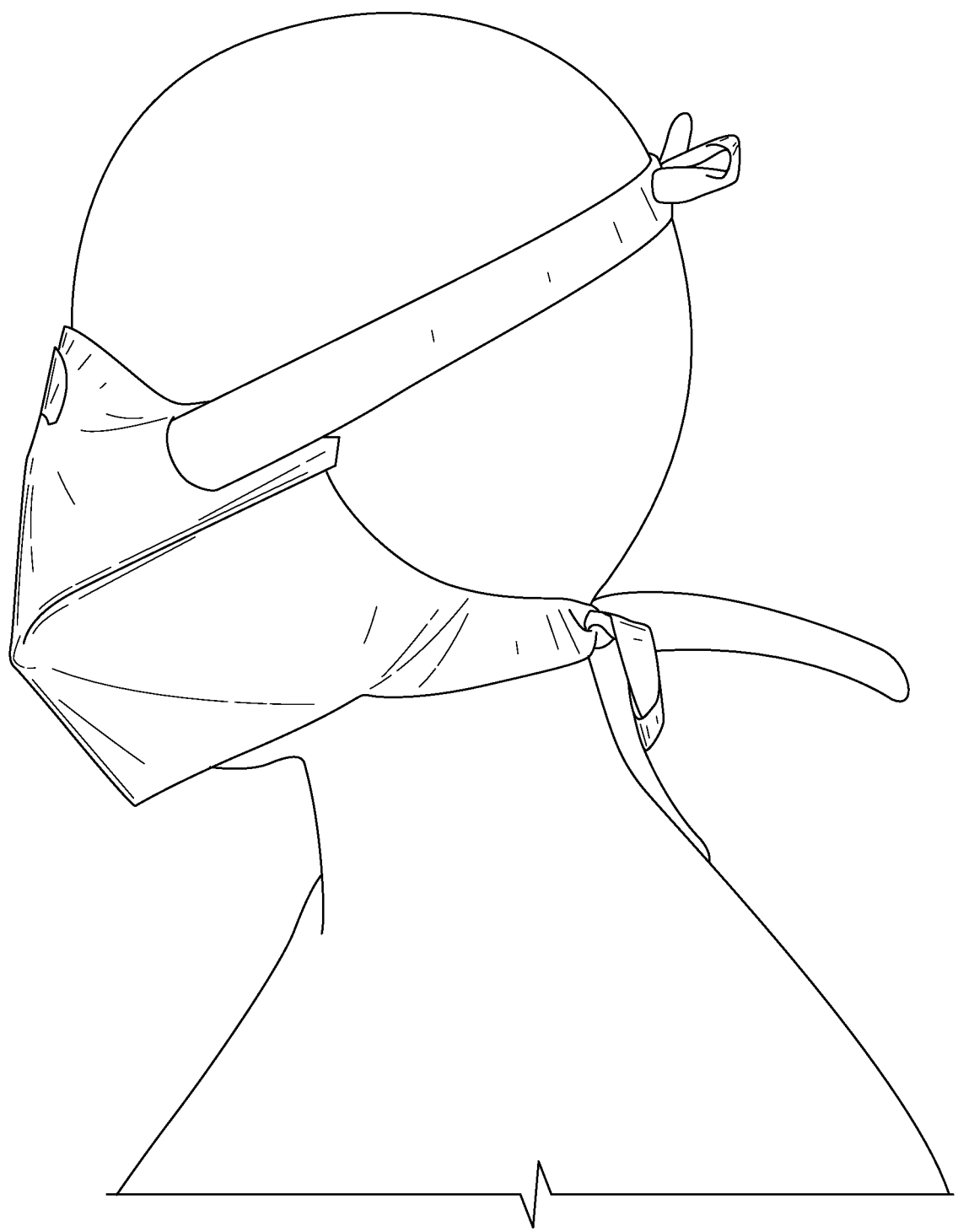
FIG. 23 shows a left-side view of the face mask of FIG. 21.
Figure 24:
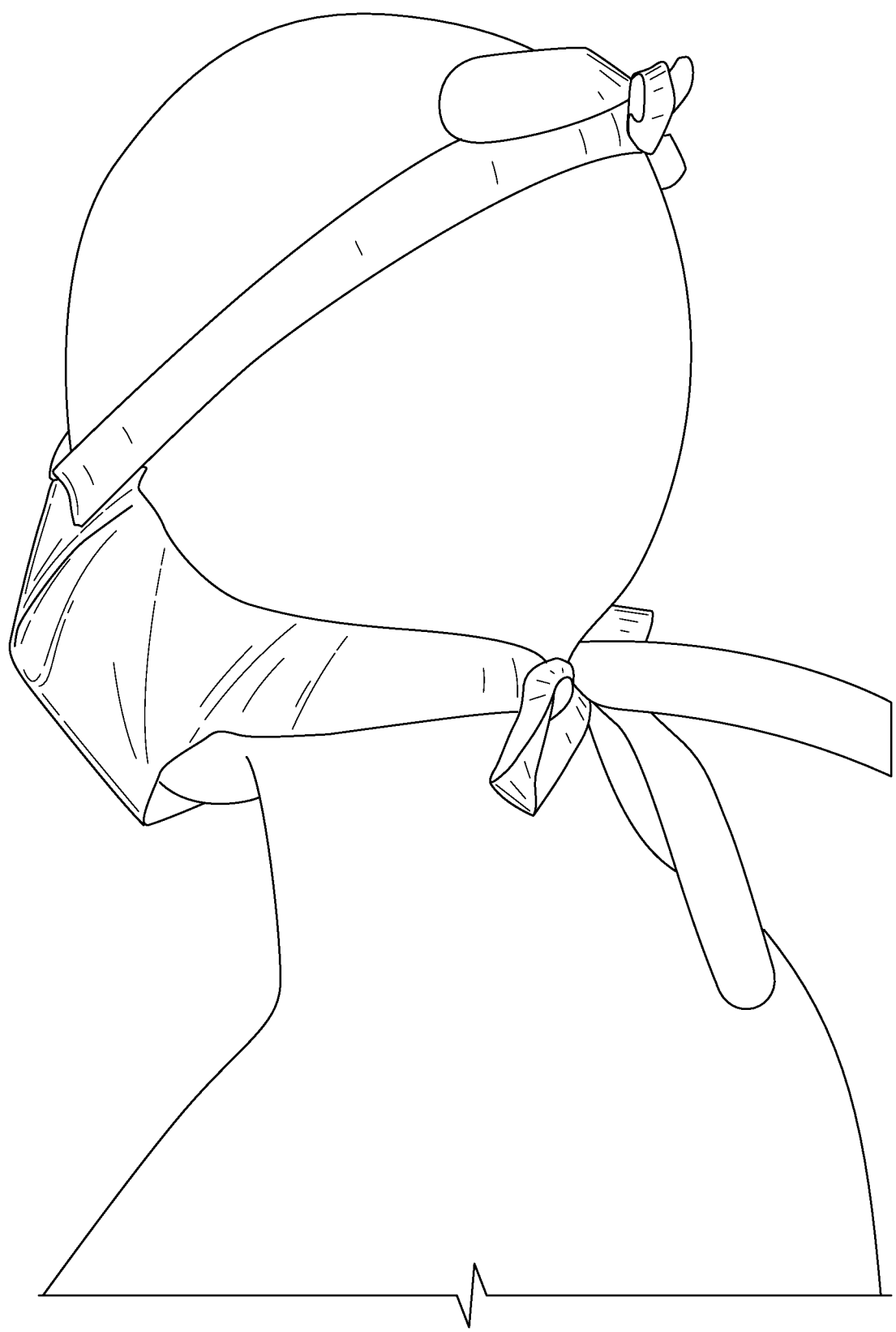
FIG. 24 shows a left-rear view of the face mask of FIG. 21.

FIGS. 21-24 show the assembled mask 20 positioned on a human head. In order to don the mask, the wearer simply places the main body portion 52 over their face with the main body portion 52 of the mask covering the nose and mouth of the wearer (i.e. with the nose tip at the end of the wearer's nose, the top perimeter 32 extending across the cheek bones and nasal bridge of the wearer, and the lower perimeter 34 extending along the jaw line under the chin of the wearer). The top two legs are then tied together at the back of the head (i.e., the legs 54 that extend through the slots 56 are tied together at the back of the head, as best shown in FIGS. 23 and 24). Next, the bottom two legs are tied together at the back of the wearer's neck (or vice-versa with the bottom two legs tied before the top two legs). The result is a face mask that is conveniently formed from a single sheet of material and provides a secure, comfortable, and effective face mask for the wearer.

It will be recognized from the method illustrated in FIGS. 4-20 that the face mask 20 may be easily assembled by a human user from a single piece of flat material that is pre-cut into the desired shape. Because of this, the face mask 20 may be assembled by either the manufacturer or by medical professionals or other individuals who intend to use the face mask. Large quantities of the face mask may be easily stored in flat form taking up little volume. The face masks 20 may then be assembled either in a plant, or in the field (e.g., a hospital), as needed. Alternatively, a single face mask may be easily manufactured by an individual user having limited supplies when other face masks are not available.

Once assembled, the face mask 20 provides a minimal contact mask that provides fluid transmission protection for the user. The face shield 30 is placed over the user's nose and mouth, and the straps 40 are tied together at the rear of the user's head. The flexible perimeter and the cut of the face mask 20 is such that it nicely conforms to the face of the user, providing a comfortable mask with a high degree of fluid transmission prevention. Moreover, because the single sheet of material 50 is folded along the center fold line $60_5$ (as noted in association with FIGS. 18-19), the mask is a two layer mask (i.e., is inherently a double mask) wherein two layers of material cover the mouth and nose when worn on a human face. The two layers of material are only secured together along the perimeter (i.e., at the center fold line $60_5$ and at the slot locations), resulting in a two layer mask with a generally free-floating arrangement between the two layers (i.e., the interior portion of each layer is freely moveable with respect to the other layer). Such a two-layer mask may be advantageous in preventing the transmission and reception of pathogens.

Figure 25:
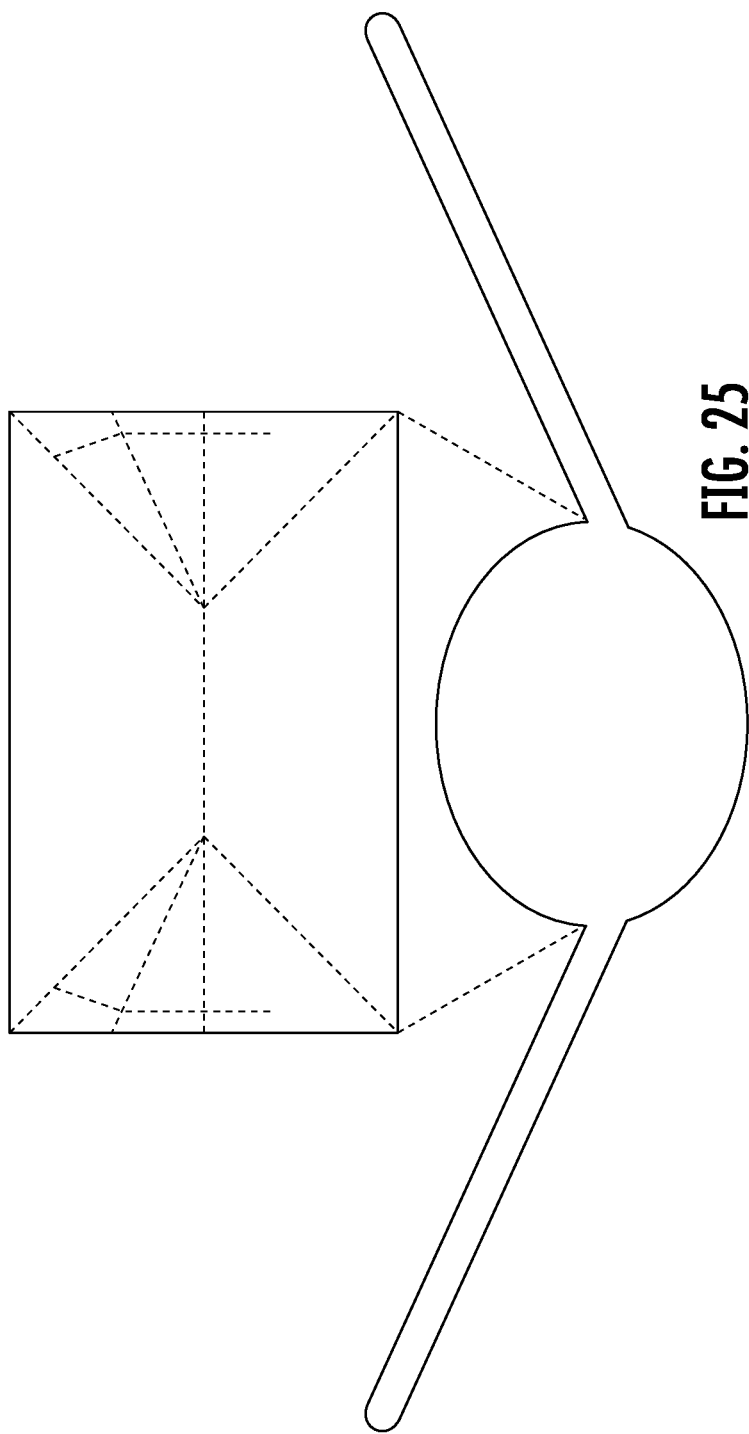
FIG. 25 shows a single piece of material used to form an alternative embodiment the face mask of FIG. 1 having only two straps.
Figure 26:
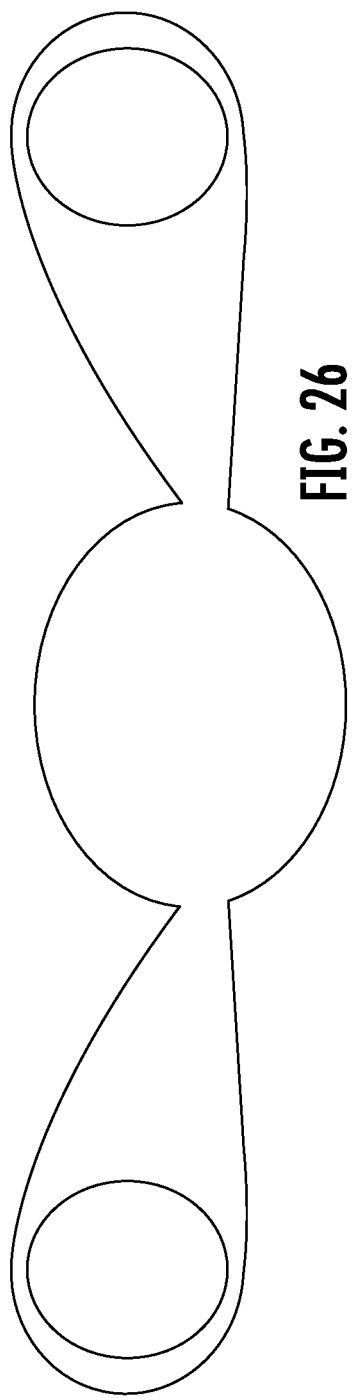
FIG. 26 shows a single piece of material used to form yet another alternative embodiment of the face mask of FIG. 1 with ear loops.

It will be recognized that numerous alternative embodiments of the face mask 20 are possible. For example, as shown in FIG. 25, in at least one alternative embodiment, the face mask is made with only two straps instead of four. As yet another example, as shown in FIG. 26, in another embodiment the straps include ear loops such that the straps are secured to the ear of the wearer, and do not need to be tied behind the head of the user. In other alternative embodiments, additional components could be added to the single piece of material to provide additional features. For example, in at least one alternative embodiment, a piece of wire may be attached to the top perimeter 32 of the face shield 30 along the bridge of the nose. Stitching or some other fastener could be used to make such a connection. This wire would have several advantages, including providing for an adjustable bridge that would provide an even closer contour along the nose of the wearer. It will be appreciated that numerous additional alternative embodiments are also contemplated.

The foregoing detailed description of one or more embodiments of the face mask and method of making a face mask have been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by any appended claims. Therefore, the spirit and scope of any appended claims should not be limited to the description of the embodiments contained herein.

What is claimed is:

1. A face mask comprising:
   a piece of fabric including a main body portion, a first leg extending from a first side of the main body portion, and a second leg extending from a second side of the main body portion;
   a first plurality of slots arranged along a perimeter of the first side of the main body portion, and a second plurality of slots arranged along a perimeter of the second side of the main body portion; and
   a plurality of folds in the piece of fabric including at least one first fold extending between the first plurality of slots and at least one second fold extending between the second plurality of slots;
   wherein the first plurality of slots are aligned and the first leg extends through the first plurality of slots, and wherein the second plurality of slots are aligned and the second leg extends through the second plurality of slots.

2. The face mask of claim 1 further comprising a center fold extending through the main body portion and a tab inserted in a coupling slot provided along a perimeter portion positioned between the first side perimeter and the second side perimeter.

3. The face mask of claim 2 wherein a chin protrusion is defined along the center fold, wherein a central nose tip is defined by the main body portion, and wherein the coupling slot is arranged along a nose bridge.

4. The face mask of claim 1 further comprising a third leg extending from the first side of the main body portion and a fourth leg extending from the second side of the main body portion, wherein the third leg and the fourth leg do not extend through any of the slots.

5. The face mask of claim 1 wherein the piece of fabric is a laser cut or die cut piece of fabric.

6. The face mask of claim 1 further comprising first indicia extending along the at least one first fold on the piece of fabric, and second indicia extending along the at least one second fold on the piece of fabric.

7. The face mask of claim 1 further comprising a first notch at a proximate end of the first leg, the first notch seated in the first plurality of slots, and a second notch at a proximate end of the second leg, the second notch seated in the second plurality of slots.

8. The facemask of claim 1 wherein the first leg and the second leg are integrally formed with the main body portion on the piece of fabric.

9. The facemask of claim 1 wherein the face mask is a unitary structure with the first leg, the second leg, the main body portion, the first plurality of slots and the second plurality of slots all provided on the piece of fabric without couplings.

10. A method of making a face mask comprising:
   cutting a sheet of fabric into a predetermined shape including a main body portion, a first leg extending from a first side of the main body portion, and a second leg extending from a second side of the main body portion;
   forming a first plurality of slots along a perimeter of the first side perimeter of the main body portion;
   forming a second plurality of slots arranged along a perimeter of the second side perimeter of the main body portion;
   folding the sheet of fabric to include at least one first fold extending between the first plurality of slots such that the first plurality of slots are aligned and overlapping;
   folding the sheet of fabric to include at least one second fold extending between the second plurality of slots such that the second plurality of slots are aligned and overlapping;
   inserting the first leg through the aligned first plurality of slots such that the first leg extends through the first plurality of slots;
   inserting the second leg through the aligned second plurality of slots such that the second leg extends through the second plurality of slots;
   placing the main body portion over the face of a wearer; and
   tying the first leg to the second leg.

11. The method of claim 10 further comprising folding the main body portion along a center fold.

12. The method of claim 10 wherein inserting the first leg through the first plurality of slots includes seating a first notch in the first leg in the first plurality of slots, and wherein inserting the second leg through the second plurality of slots includes seating a second notch in the second leg in the second plurality of slots.

13. The method of claim 10 wherein the first leg and the second leg are integrally formed with the main body portion on the piece of fabric.

14. A cut piece of fabric for a face mask, the cut piece of fabric comprising:
   a main body portion;
   a first leg extending from a first side of the main body portion;
   a second leg extending from a second side of the main body portion;
   a first plurality of slots arranged along a perimeter of the first side perimeter of the main body portion;
   a second plurality of slots arranged along a perimeter of the second side perimeter of the main body portion;
   first fold indicia extending between the first plurality of slots;
   second fold indicia extending between the second plurality of slots; and
   center fold indicia extending across the main body between the first side and the second side of the main body.

15. The cut piece of fabric of claim 14 further comprising a first notch at a proximate end of the first leg and a second notch at a proximate end of the second leg.

16. The cut piece of fabric of claim 14 further comprising a third leg extending from the first side of the main body portion and a fourth leg extending from the second side of the main body portion, wherein the first leg is parallel to the third leg, and wherein the second leg is parallel to the fourth leg.

17. The cut piece of fabric of claim 14 wherein the first leg is angled between 30° and 60° in a first direction relative to the center fold, and wherein the second leg is angled between 30° and 60° in a second direction relative to the center fold.

18. The cut piece of fabric of claim 14 wherein the first leg and the second leg are integrally formed with the main body portion on the piece of fabric.

19. The cut piece of fabric of claim 14 wherein the cut piece of fabric is a unitary structure with the first leg, the second leg, the main body portion, the first plurality of slots and the second plurality of slots all provided on the cut piece of fabric without couplings.

* * * * *